(12) United States Patent
Grinberg et al.

(10) Patent No.: US 9,189,712 B1
(45) Date of Patent: *Nov. 17, 2015

(54) METHOD AND SYSTEM FOR OVERPRINTING A FIRST DIGITAL IMAGE OVER A PRE-PRINTED SECOND IMAGE

(71) Applicants: Eli Grinberg, Pardesia (IL); Kobi Bar, Kfar Saba (IL)

(72) Inventors: Eli Grinberg, Pardesia (IL); Kobi Bar, Kfar Saba (IL)

(73) Assignee: SCODIX LTD., Rosh Ha'Ain (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/304,936

(22) Filed: Jun. 15, 2014

Related U.S. Application Data

(63) Continuation-in-part of application No. 12/682,163, filed on May 16, 2011, now abandoned.

(51) Int. Cl.
*G06K 15/10* (2006.01)
*G06K 15/02* (2006.01)

(52) U.S. Cl.
CPC ............. *G06K 15/027* (2013.01); *G06K 15/105* (2013.01); *G06K 2215/101* (2013.01); *G06K 2215/111* (2013.01)

(58) Field of Classification Search
CPC .......... H04N 1/00002; H04N 1/00015; H04N 1/00034; H04N 1/00037; H04N 1/00045; H04N 1/00047; H04N 1/00058; H04N 1/19; H04N 1/1906

USPC ................... 358/1.5, 1.9, 3.28, 1.1
See application file for complete search history.

(56) References Cited

U.S. PATENT DOCUMENTS

| 4,319,255 | A | * | 3/1982 | Franczyk et al. ............. 347/161 |
| 4,857,715 | A | | 8/1989 | Koch et al. |
| 5,434,956 | A | | 7/1995 | Son et al. |
| 5,569,512 | A | * | 10/1996 | Brawner et al. ................. 428/29 |
| 5,600,350 | A | | 2/1997 | Cobbs et al. |
| 5,803,504 | A | | 9/1998 | Deshiens et al. |
| 6,002,416 | A | * | 12/1999 | Gerber .......................... 347/176 |
| 6,325,480 | B1 | * | 12/2001 | Moghadam et al. ............ 347/19 |
| 6,454,383 | B2 | | 9/2002 | Lund et al. |
| 6,840,173 | B2 | | 1/2005 | Kawabata et al. |
| 2011/0219974 | A1 | * | 9/2011 | Grinberg et al. .............. 101/481 |

* cited by examiner

*Primary Examiner* — Martin Mushambo

(57) ABSTRACT

A method of adaptive overprinting of a first digital image over a pre-printed second image comprising at least one feature, the method comprising: capturing an image of a substrate pre-printed with said second image and with at least one registration mark; automatically computing: one or more offsets from intended pre-determined properties of the at least one registration mark; and one or more compensation adjustment values to be applied to properties of the at least one feature, based on said one or more computed offsets; applying said computed one or more compensation adjustment values to said first digital image to create a corrected digital image; and printing said corrected digital image over said second image.

20 Claims, 8 Drawing Sheets

METHOD AND SYSTEM FOR OVERPRINTING A FIRST DIGITAL IMAGE OVER A PRE-PRINTED SECOND IMAGE

FIELD OF THE INVENTION

The present invention relates to overprinting, and more particularly to adaptive corrected overprinting.

BACKGROUND OF THE INVENTION

Overprinting is the intentional printing of one or more layers of ink, or other such printing media, on top of another, for example by coating or varnishing. In this manner, a previously printed media can be enhanced, for example, with a glossy finish. The overprint or overcoat can be on the entire media or substrate, on one or more features previously printed on the substrate or be printing printed adjacent to previously printed features, or any combination of these.

To print on specific features and produce a high quality overprint, it is critical that the overprint ink be accurately applied on the substrate. For this purpose, the overprint coating applicator, for example, an ink-jet nozzle, must be accurately aligned with the features to be coated.

Another example of overprinting one in which a symbol or text, etc, is printed after a first printing, and the overprinting is printed adjacent or in proximity to, but not necessarily directly over, the symbol or text.

U.S. Pat. No. 4,857,715 (Koch et al) discloses a scannable form for an optical mark scanning apparatus in the form of a generally rectangular sheet of paper or like material having a preprinted timing track along one edge and a plurality of preprinted quality assurance marks is printed by a laser printer with customized questions and corresponding response bubbles to create a survey form. An overprint registration system is used in conjunction with the scannable forms to align material for printing on the scannable forms prior to printing the survey form by printing an overprint registration mark corresponding to at least one of the quality assurance marks and adjusting the position of the overprint registration mark to establish the alignment between the response bubbles to be printed and the preprinted timing track. The system may also include a verification process wherein a plurality of alignment marks will be overprinted in the position of the overprint registration marks during the printing of the survey form, so that the alignment of each form in relation to the quality assurance marks may be verified during scanning.

U.S. Pat. No. 5,600,350 (Cobbs et al) describes an image registration system for a multicolor inkjet printer/plotter. The system comprises a carriage assembly for retaining multiple inkjet cartridges. Each cartridge has a plurality of nozzles adapted to eject ink in response to the application of an electrical signal thereto. A first mechanism is provided for moving the carriage assembly means in a first axis. A second mechanism is provided for moving print media in a second axis transverse to the first axis, the first axis being a scan axis and the second axis being a media axis. A first position encoder senses the position of the carriage assembly in the first axis and a second position encoder senses the carriage assembly in the second axis and providing position encoder signals in response thereto. A control circuit provides electrical signals which cause the nozzles in the inkjet cartridges to eject ink onto the media and create an image thereon in response to timing signals. The system includes a sensor module which optically senses the image and provides a set of sensed signals in response thereto. The sensed signals are processed to provide timing signals for use in correcting the image miss-registration.

U.S. Pat. No. 6,454,383 (Lund et al) provides a method and apparatus for a test pattern used in the alignment of an ink-jet pen which deposits fixer fluid, or other clear ink precursor fluid, on print media uses the change in reflectivity caused by overprinting a series of positional-calibration indicia with colorant to obtain data with respect to deviations in a carriage-scan x-axis and a paper scan y-axis. Thus the invention measures distances between pens or nozzles.

U.S. Pat. No. 5,803,504 (Deshiens et al) describes a method of producing a lottery ticket with an overprint region provided over a scratch-off layer. To ensure proper alignment of printing layers of the overprint region, photocell devices are installed at each of the stations of press maybe linked to various controls of the paper feeding mechanism of the press. Preferably, the registration devices in the flexographic press should allow no more than a 0.005 inch (0.013 cm) variation on each station.

U.S. Pat. No. 6,840,173 (Kawabata et al) discloses a plate cylinder and printing plate holder for the cylinder, which is capable of adjusting relative positions of plural printing plate holders and fixing the printing plate holders on the plate cylinder without causing misalignments of images among printing plates held by the printing plate holders even after overprinting. The plate cylinder is equipped with at least two printing plates wrapped around the outer circumference thereof. The plate cylinder comprises printing plate holders, one per each printing plate, for holding the printing plates on the outer circumference of the plate cylinder. The printing plate holders include one printing plate holder in a stationary state and fixed against the plate cylinder and other printing plate holders that are adjustable to move in the circumferential direction of the plate cylinder and fixable against the plate cylinder.

U.S. Pat. No. 5,434,956 (Myungsea son et al) discloses a method and apparatus for printing an image in a specified positional relationship with a preprinted registration mark. Each two-dimensional alignment mark on a printing medium is found by using information about the whole mark area, or with respect to each of two different directions relative to the medium by using a distinctive two-dimensional pattern or characteristic of the mark; or by finding the mark centroid, or by scanning the mark region to obtain a two-dimensional representation for analysis—and preferably by combinations of these procedures. An image is then aligned and printed by reference to the mark so located. A previous image may also be preprinted in known relation with the mark, so that the new image is aligned with the preprinted one—sometimes on the same piece of medium. Preferably information used includes the mark's intended size, shape, areal disposition and other properties; and a two-dimensional search template is defined which matches the mark in at least one of these. A template position is then found that essentially maximizes areal intersection with the mark; this position is then treated as the mark position, for printing the new image. The invention preferably determines a position of the template along each of two directions in alternation—maximizing the areal intersection with respect to shifting along each direction, iteratively—until no significant increase is obtained.

U.S. Pat. No. 6,325,480 (Moghadam et al) discloses an inkjet printer and method capable of forming a plurality of registration marks on a receiver and sensing the marks formed thereby. The method includes a print head for printing an image of predetermined length on the receiver. The receiver has an image area for receiving the image therein and a border area adjacent to the image area. A marker forms the plurality of registration marks in the border area, so that the marks extend the length of the image. In addition, a sensor is disposed in sensing relationship to the marks for sensing the marks. The invention provides a combination marker for marking a receiver and a sensor for sensing the marks so that each image line is in registration with other lines of the image. Also, use of the invention avoids need for costly precision motors to advance the receiver during printing of image lines.

To aid in applying the overprint coating accurately, prior art relies on registration markers, typically in the form of cross hairs, located in two corners of the substrate. However, during the pre-overprinting print, registration markers and the specific features may be misaligned; i.e. moved from their intended location in an x-direction, and/or a y-direction, and/or at an angle, and/or due to scaling (enlargement/reduction) and so on. Other types of misalignment can also be present, as will be discussed in more detail below.

It is therefore a long felt need to disclose a means and method for overprinting that overcomes the difficulty of identifying a misalignment between registration markers and pre-printed features, such that the overprint is not aligned in accordance with said registration markers, but rather in accordance with said pre-printed features. Moreover, it is a long felt need to address a plurality of printing shifts beyond misalignment, namely global shift, a local shift, a linear shift, an angular shift, a size shift, an intensity shift, a color shift, or any combination thereof.

It is also a long felt need to compensate for the misalignment and shifts using image processing rather than by mechanical means (a set of signals to the printer), thus enabling to address any printer suitable for the task.

SUMMARY OF THE INVENTION

According to a first aspect of the present invention there is provided a method of adaptive overprinting of a first digital image over a pre-printed second image comprising at least one feature, the method comprising: capturing an image of a substrate pre-printed with said second image and with at least one registration mark; automatically computing one or more global offsets from intended pre-determined properties of the at least one registration mark; automatically computing one or more global compensation adjustment values to be applied to the at least one feature, based on said one or more computed global offsets; applying said computed one or more global compensation adjustment values to said first digital image to create a corrected digital image; and printing said corrected digital image over said second image.

The global offset may comprise at least one of a global spatial shifts, a global intensity shift and a global color shift.

The global spatial shifts may comprise at least one of a global rotational shift and a global size shift.

The method may further comprise: automatically computing one or more local offsets from intended pre-determined properties of the at least one feature; automatically computing one or more local compensation adjustment values to be applied to the at least one feature, based on said one or more computed local offsets; and applying said computed one or more local compensation adjustment values to said first digital image to create a corrected digital image.

The local offset may comprise one or more missing parts of said at least one feature.

The local offset may comprise one or more shifted parts of said at least one feature.

The local offset may comprise at least one of a local intensity shift and a local color shift.

The method may further comprise: recording in a log identification information associated with the substrate when the one or more determined offsets have values indicative that the substrate requires shift adaptive overprint intervention.

According to a second aspect of the present invention there is provided a system for adaptive overprinting of a first digital image over a pre-printed second image comprising at least one feature, the system comprising: an imager configured to capture an image of a substrate pre-printed with said second image and with at least one registration mark; a processor configured to: automatically compute one or more global offsets from intended properties of the at least one registration mark pre-printed on the substrate, based on the captured image of the substrate; automatically compute one or more global compensation adjustment values to be applied to the at least one feature, based on said computed global offsets; and apply said computed one or more global compensation adjustment values to said first digital image to create a corrected digital image; and a printer configured to print said corrected digital image over said second image.

The global offset may comprise at least one of a global spatial shift, a global intensity shift and a global color shift.

The global spatial shifts may comprise at least one of a global rotational shift and a global size shift.

The processor may further be configured to: automatically compute one or more local offsets from intended pre-determined properties of the at least one feature; automatically compute one or more local compensation adjustment values to be applied to the at least one feature, based on said one or more computed local offsets; and apply said computed one or more local compensation adjustment values to said first digital image to create a corrected digital image.

The local offset may comprise one or more missing parts of said at least one feature.

The local offset may comprise one or more shifted parts of said at least one feature.

The local offset may comprise at least one of a local intensity shift and a local color shift.

The substrate may be a single page.

The substrate may be part of a roll.

The printing may be done by printing with one of: varnish, colors, security inks and conductive inks.

BRIEF DESCRIPTION OF THE DRAWINGS

The invention may be more clearly understood upon reading of the following detailed description of non-limiting exemplary embodiments thereof, with reference to the following drawings, in which.

DESCRIPTION OF EMBODIMENTS OF THE INVENTION

The following description is provided, alongside all chapters of the present invention, so as to enable any person skilled in the art to make use of said invention and sets forth the best modes contemplated by the inventor of carrying out this invention. Various modifications, however, will remain apparent to those skilled in the art, since the generic principles of the present invention have been defined specifically to provide a means and method for adaptive overprinting.

The term 'handling device' refers hereinafter to the devices or mechanisms for feeding a substrate into a printing device, for holding the substrate during printing and for expelling the substrate after printing.

The term 'plurality' refers hereinafter to any integer number equal or higher than one, e.g., 2, 3, 4, etc.

The terms 'shift' or 'printing shift' are used interchangeably hereinafter in the broadest manner including a longitudinal and/or lateral disposition (i.e. x-y or Cartesian coordinate skew; also know as a linear shift); an angular shift or disposition (i.e. polar coordinate type); a size shift (e.g. due to an enlargement or size reduction anomaly of any or all features or portion(s) thereof); a local shift (i.e. wherein only one or some—or portions thereof—of features contain anomalies or deviations; an intensity shift (i.e. the intensity or boldness or portion thereof deviates from the designed intensity a color shift wherein the color or shade of a feature(s) appearing on the substrate are not as intended (e.g. fading due to age or sun exposure, dirt, chemicals, etc) or the color shift is used to determine a proper color for matching a color to be printed adjacent to the feature(s). Aside from the local shifts, the aforementioned shift types may be categorized as "global shifts" if the feature(s) are affected (shifted, etc.) in an analogous manner to the registration markers.

The aforementioned meanings and explanations of the interchangeable terms misalignment, skew and shift should become clearer upon reading of the detailed description.

The term 'substrate' is used in its broadest meaning and includes any medium that can be printed upon, for example, paper, plastic, wood, metal, films and so on.

The 'pre-printed feature' refers hereinafter to any image or markings that have been stamped upon a substrate prior to being introduced to the overprint system.

Advantages of the overprinting system and method of the present invention include:
1. It does not require set up and does not require plates, screens or pre-press preparation.
2. It can be used for flood coating or spot coating, e.g. a UV spot coating.
3. It is conveniently used with most common paper sizes in the conventional and digital printing industry.
4. The coating is determined directly from a computer file.

Figure 1:
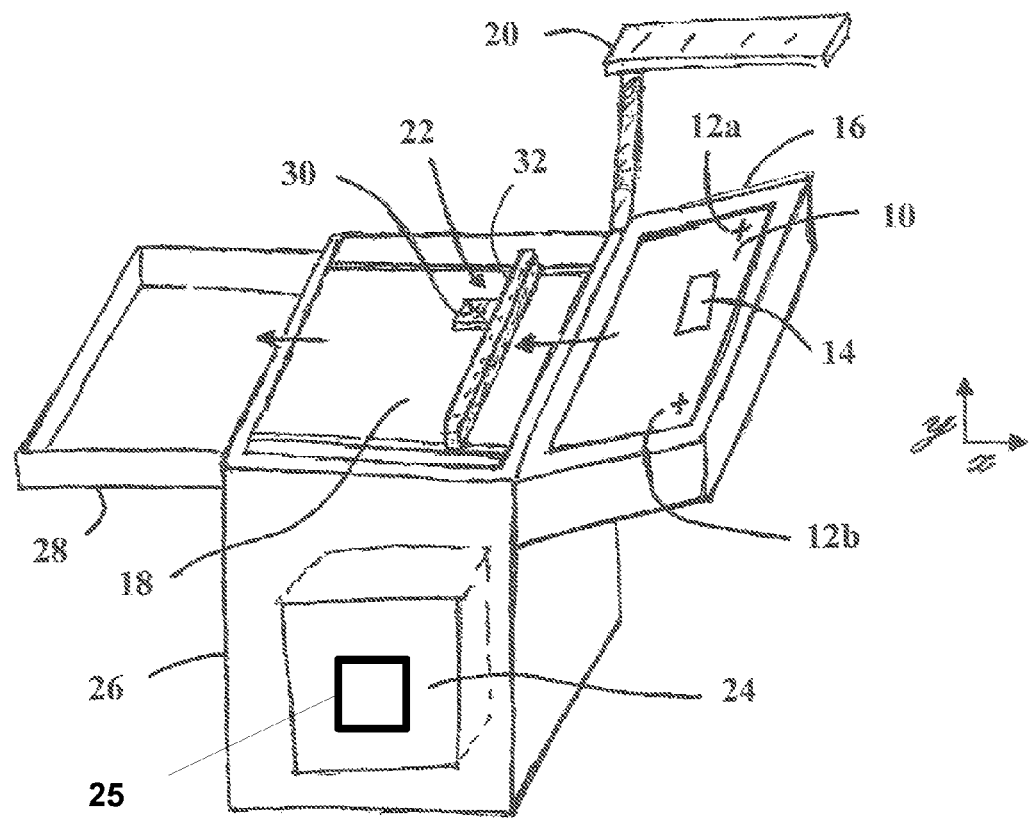
FIG. 1 is a perspective view of an embodiment of a printing system for overprinting on a substrate of the present invention.

FIG. 1 shows an embodiment of an overprinting system of the present invention for printing on a substrate 10, for example a sheet of paper and the like. The substrate 10 has a pair of registration markers 12a and 12b, typically in the form of cross hairs, located for example in two corners thereof. The substrate 10 further comprises a feature 14 from a previous printing thereon, shown as a square for demonstration purposes only. The feature 14 or parts thereof are designed to be overprinted by the overprinting system or to serve as a reference point for overprinting.

The system of the present invention comprises a paper feeder 16, a platform 18 for receiving the substrate 10, an imaging device or imager 20, an overprinting mechanism 22, a control module or controller 24, shown housed in a housing or cabinet 26 and a processor 25 configured to perform image processing. The controller 24 is operationally connected to the imager 20 and to the overprinting mechanism 22.

The system also comprises a device (not shown) for moving the paper 10 from the platform 18 where overprinting occurs to any following stage, for example, exposure to UV radiation to dry the overprinting ink, in the case of a UV spot coating. Such following stage is represented schematically by tray 28.

In accordance with particular embodiments, the overprinting mechanism 22 comprises a printing head such as an ink-jet nozzle 30 or a plurality thereof (only one shown), and a mechanism for holding and moving the ink-jet nozzle such as a moveable bar 32. The overprinting mechanism 22 may be designed to move the ink jet nozzle 30 in both the x-direction and y-direction, for example by moving the ink jet nozzle 30 along the bar 32 (e.g. in the x-direction) and moving the bar (e.g. in the y-direction) over the substrate 10 when it resides on the platform 18. It should be understood that other printing mechanisms may be used, for example, a laser printing mechanism (not shown).

The imager 20 is typically an optical imager whose function and mechanism can constituted by a variety of means, for example it may be housed in the bar 32 and scan the substrate 10. Likewise, it should be understood that other ink-jet nozzle movement options can be devised, one example being wherein the substrate 10 is moved in one or both of the x-direction and/or y-direction—or in combination with the overprinting mechanism 22.

In another embodiment of the present invention, the paper feeder 16 may be replaced by a roll to roll feeding method or by any feeding method known in the art.

In the present invention, a plurality of registration marks may be applied. The greater the number of registration markers the greater the degree of accuracy that may be achieved in aligning the overprint to the pre-printed image on the substrate. For explanation purposes the description hereinafter refers to a pair of markers but it is understood that the scope of the invention is not limited to these specific examples.

In cases of a distortion offset, a rotation offset and the like the correction will be better and more accurate with a plurality of markers. The higher the number of registration marks, the better the compensation may be. As will be described below, the compensation may be done by the processor using image processing by manipulating the overprinting file and when needed, manipulating the digitized image of the master substrate as well as will be explained below. Thus the printing and/or the overprinting may be done with any printer suitable for the task, independent of the specific printer, since the compensation is done on the image and not by controlling the printer movements.

Figure 2:
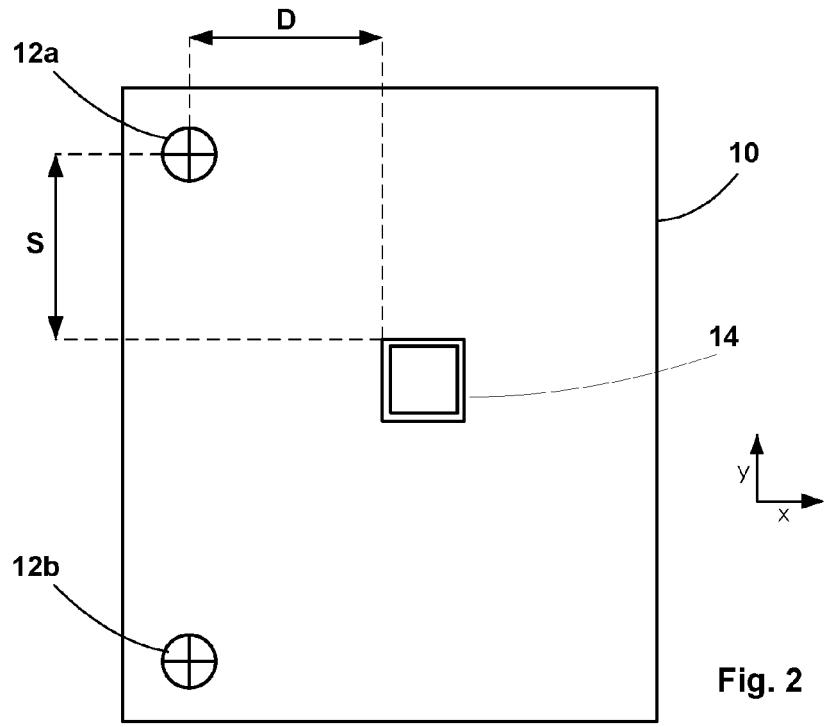
FIG. 2 is an elevated view of a substrate having a feature disposed in its designed location (with no offset)

FIG. 2 shows the substrate 10 with its registration markers 12a and 12b in their intended locations. These registration markers 12a and 12b are standard commercially utilized markers. For explanation purposes, the feature 14 is shown a distance of "D" units in the x-direction from the registration marker 12a center and a distance of "S" units in the y-direction from that marker. However, due to offset(s), the registration markers 12a and 12b may not be in their intended locations.

Figure 3A:
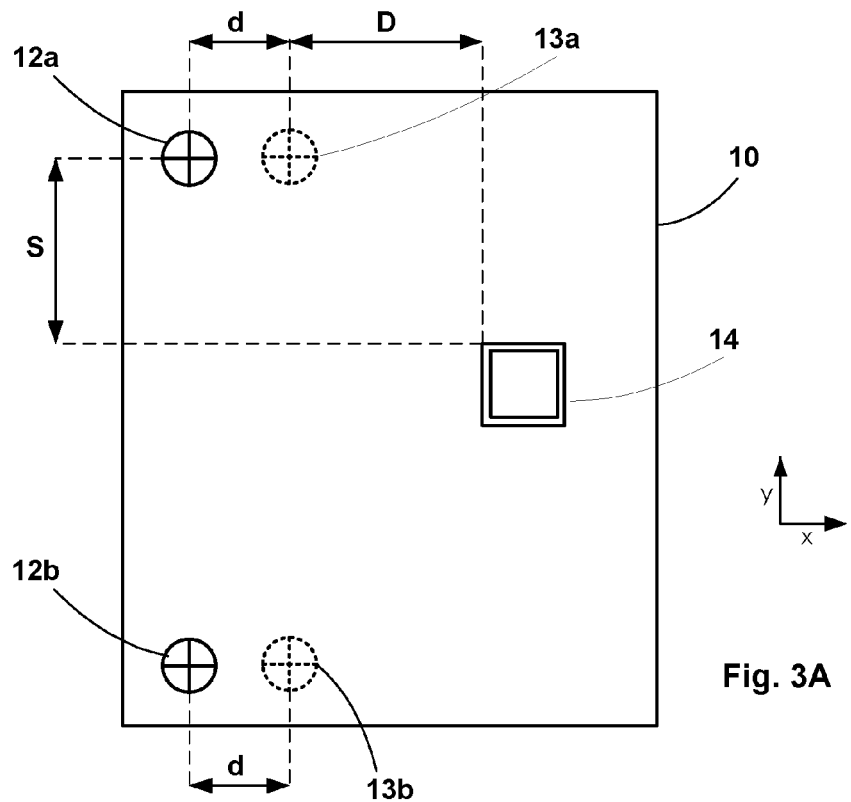
FIGS. 3A-3H are elevated views of substrates with exemplary offsets that can accurately overprinted by the printing system of the present invention.

FIG. 3A shows a first example of a possible offset wherein the registration markers 12a and 12b are not in their intended locations. In this example, the registration markers 12a and 12b are shifted or translated a distance "d" in the x-direction from those intended locations. For explanation purposes, the shifted registration marks are shown using dashed lines and their actual positions are designated 13a and 13b, respectively. These reference numerals will be used throughout in regard to global positional and size offsets (as compared to local offsets, intensity offsets and color offsets, which will be discussed below).

Prior to applying the overprint, the imager 20 images the substrate 10 or parts thereof and thereby determines and quantifies the aforementioned shift, i.e. the actual locations 13a and 13b of the registration markers 12a and 12b and that the shift is "d" units in the x-direction. The feature 14 is therefore determined to be shifted "d" units in the x-direction from its intended location. This information is conveyed to the controller 24 which in turn actuates and controls the overprinting mechanism 22 to compensate for this offset. Thus an accurate overprinting over or in relation to feature 14 can be performed.

Alternatively, the compensation process may be done by the processor using image processing, namely, by manipulating the overprinting file according to the x-direction offset. Then, printing the manipulated file over or in relation to feature 14. Thus an accurate overprinting can be performed.

Figure 3B:
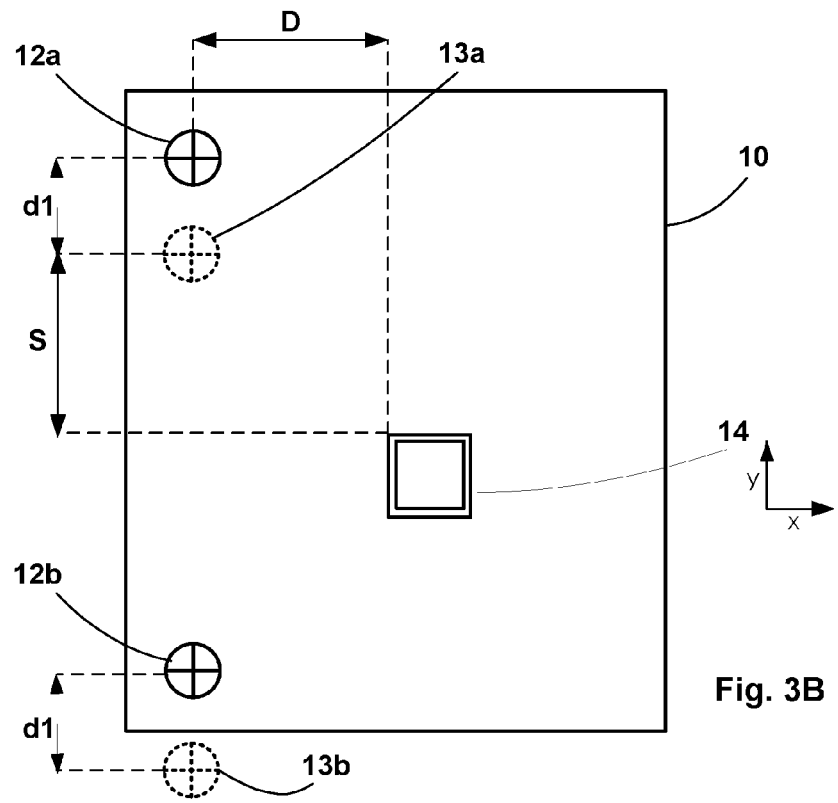

FIG. 3B shows another example of a possible offset wherein the registration markers 12a and 12b are not in their intended locations. In this example, the registration markers 12a and 12b are shifted or translated a distance "d1" in the y-direction from those intended locations.

In a similar manner as described with reference to FIG. 3A, prior to applying the overprint, the imager 20 images the substrate 10 or parts thereof and thereby determines and quantifies the aforementioned shift, i.e. the actual locations 13a and 13b of the registration markers 12a and 12b and that the shift is "d1" units in the y-direction. The feature 14 is therefore determined to be shifted "d1" units in the y-direction from its intended location. This information is conveyed to the controller 24 which in turn actuates and controls the overprinting mechanism 22 to compensate for this offset.

Alternatively, the compensation process may be done by the processor using image processing, namely, by manipulating the overprinting file according to the y-direction offset. Then, printing the manipulated file over or in relation to feature 14. Thus an accurate overprinting can be performed.

Figure 3C:
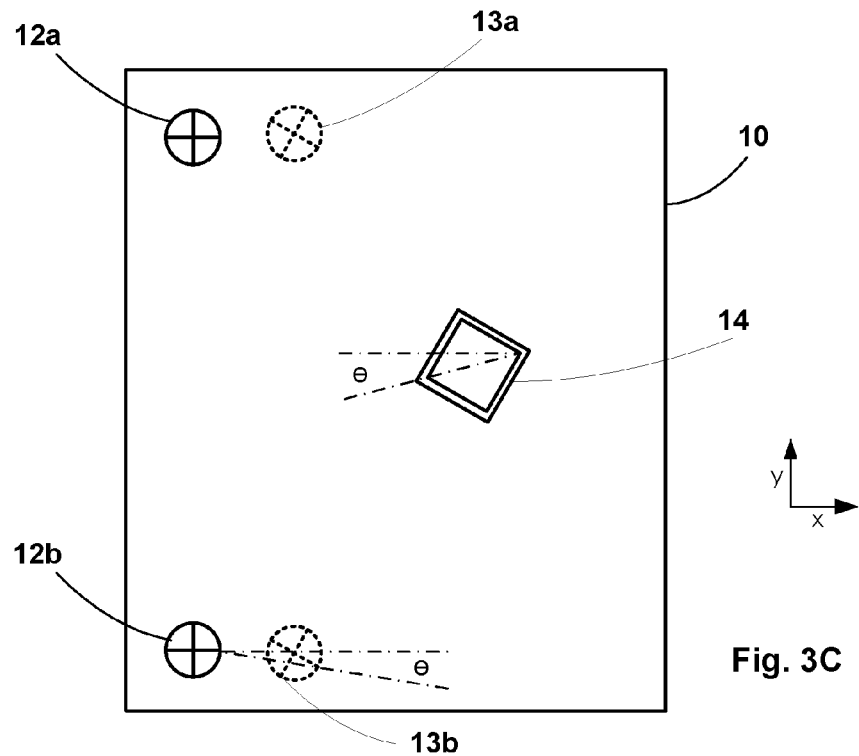

FIG. 3C shows yet another example of a possible offset wherein the registration markers 12a and 12b are not in their intended locations. In this example, the registration markers 12a and 12b are turned or angled at an angle "theta". For convenience of displaying this offset, the actual positions 13a and 13b will be displayed as having an x-direction offset as well (however, the feature 14 is not shifted). It should be understood that any and all combinations of offsets, those already described, those yet to be described, and those not described herein but falling within the scope of the claimed invention, can occur separately or in combination.

Again, prior to applying the overprint, the imager 20 images the substrate 10 or parts thereof and thereby determines and quantifies the aforementioned shift, i.e. the actual locations 13a and 13b of the registration markers 12a and 12b and that the offset is an angle "theta" (and any x-direction and/or y-direction units shift). This information is conveyed to the controller 24 which in turn actuates and controls the overprinting mechanism 22 so that an accurate overprinting over feature 14 can be produced.

Alternatively, the compensation process may be done by the processor using image processing, namely, by manipulating the overprinting file according to the rotation angle. Then, printing the manipulated file over or in relation to feature 14. Thus an accurate overprinting can be performed.

Figure 3D:
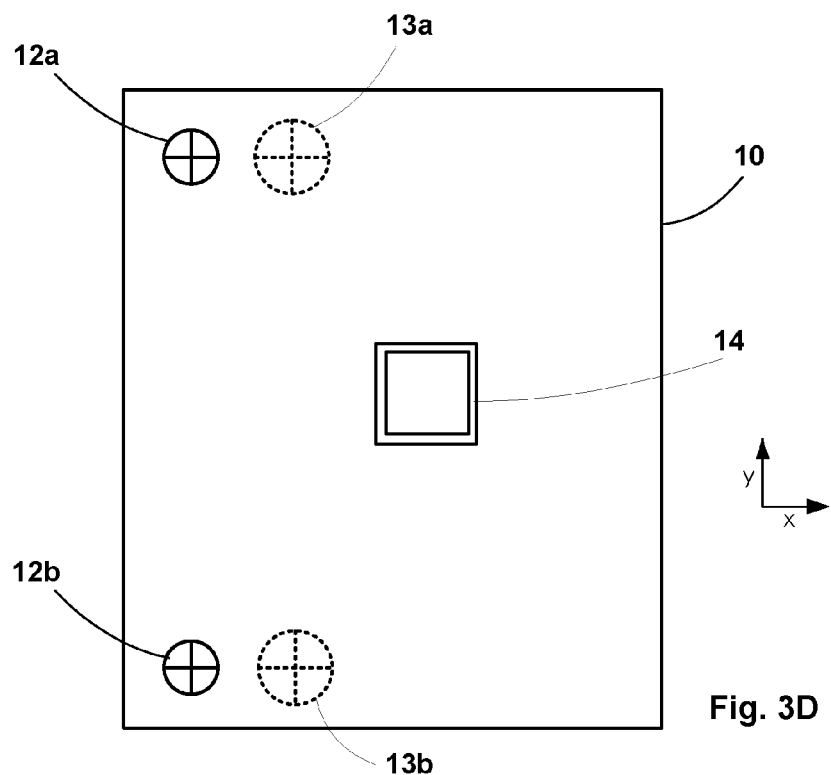

FIG. 3D shows still another example of a possible offset, which will be termed a size offset. Here, the actual (imaged) size of the markers 13a and 13b is different than the intended size of the markers 12a and 12b. Consequently, the feature 14 may appear somewhat enlarged or reduced in size versus the intended size. In FIG. 3D, an enlargement offset is exemplified. For visualization purposes only, the actual positions 13a and 13b (indicating an enlargement in this example) will be displayed as having an x-direction offset as well. It can be noticed that the feature 14 is enlarged in proportion to the enlargement of the registration markers 12a and 12b in their actual sizes 13a and 13b.

Once again, prior to applying the overprint, the imager 20 images the substrate 10 or parts thereof and thereby determines and quantifies the aforementioned enlargement, and there is a compensating effect applied by the overprinting system for this offset.

The compensation process may be done by the processor in image processing, namely, by manipulating the overprinting file according to the scaling factor. Then, printing the manipulated file over or in relation to feature 14. Thus an accurate overprinting can be performed.

Figure 3E:
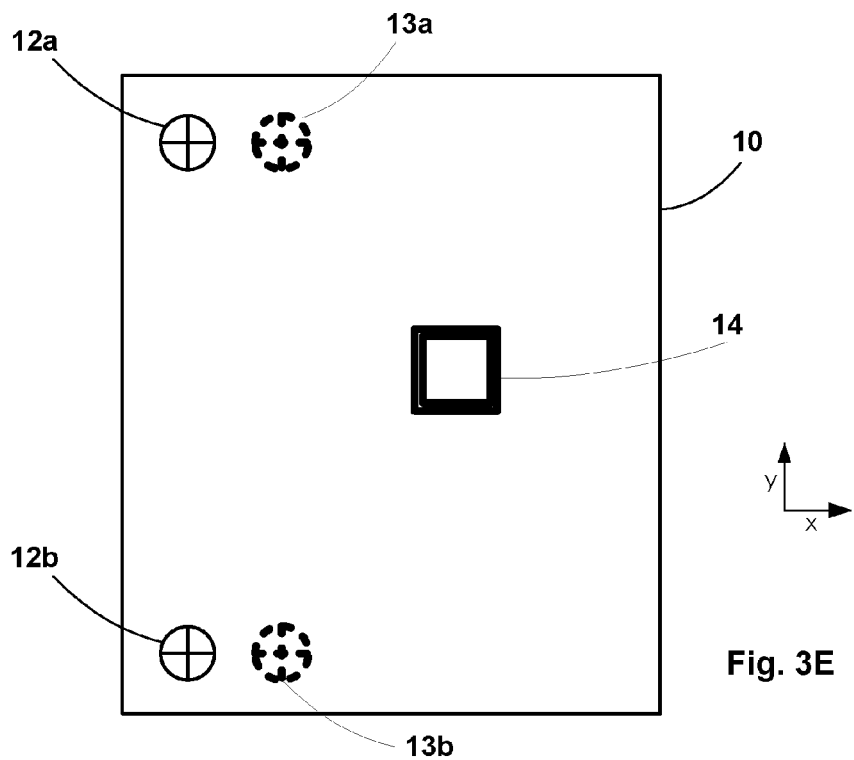

FIG. 3E shows another example of a possible offset, which will be termed an intensity offset. Here, the intensity of the markers 13a and 13b, may be different than the intended intensity, i.e. lighter or darker. For explanation purposes, to represent an increased intensity offset, i.e. bolder/darker than intended, the actual intensity is shown by thicker dashed lines of markers 13a and 13b. Similarly, the feature 14 is shown having thicker lines. It should be understood that a faded or lighter feature 14 can also appear on the substrate 10 to be overprinted. Such offsets can occur, for example, due to printing errors, printing equipment issues (nozzle blockage, spurting, etc), due to exposure to environmental factors such as light and/or dirt, and for other reasons.

The intensity information is conveyed to the controller 24 by the imager 20, which in turn actuates and controls the overprinting mechanism 22 to compensate for the intensity offset, so that a proper overprinting over or in relation to feature 14 is achieved.

Alternatively, the compensation process may be done by the processor using image processing, namely, by manipulating the overprinting file according to the intensity offset. Then, printing the manipulated file over or in relation to feature 14. Thus a suitable overprinting can be performed.

Figure 3F:
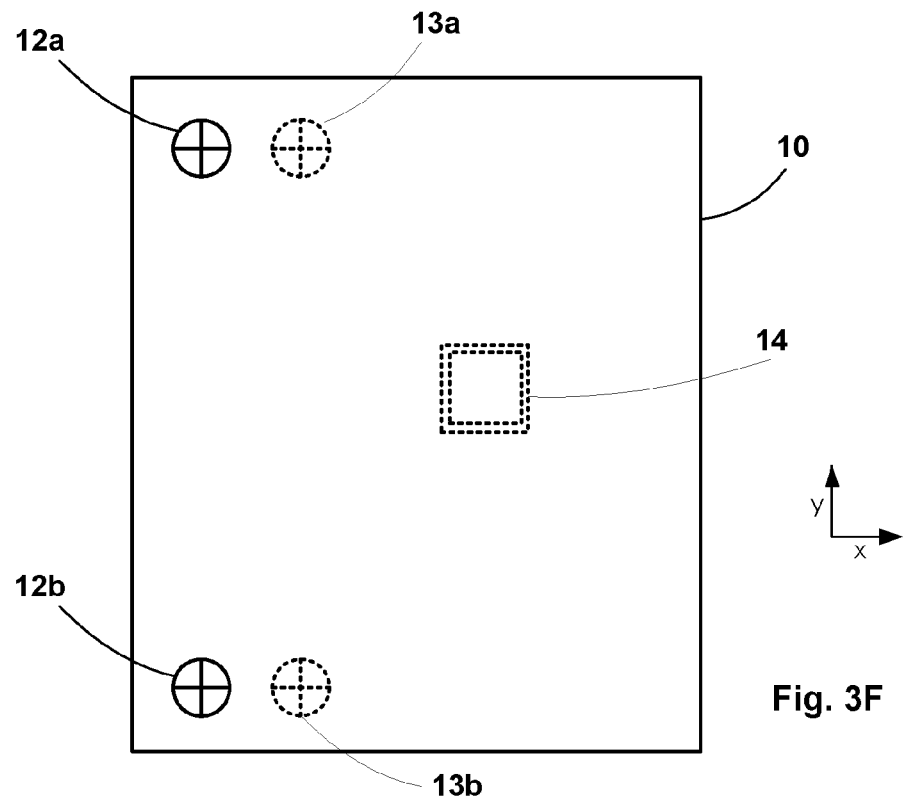

FIG. 3F shows a still further example of a possible offset, which will be termed a color offset. Here, the color(s) of the feature 14, or portions thereof, may be different than the intended color(s), e.g. a different color or shade. Such offsets can occur, for example, due to printing errors, printing equipment issues (blockage of nozzles or portions of nozzles relating to certain color or colors), fading, cover-up or distortion as a result of exposure to environmental factors such as light and/or dirt, and for other reasons.

Sometimes the overprinting is the application of a symbol (or text, etc) adjacent the feature 14, and a matching of color with the feature, or a portion of it, is desired. Such an overprinting is also considered within the scope of this example.

The color(s) can be determined, for example, by the emitted wavelength of the registration markers 12a and 12b and/or feature(s) 14 previously printed on the substrate 10.

For explanation purposes, to represent an offset wherein the color is different than intended, the actual color 13a and 13b is shown as having curved dashed lines (and slightly larger and shifted to the right so those lines can be seen more easily). To represent an analogous relationship, the feature 14 is shown having lines made up of a sequence of curved segments.

The imager 20 conveys the color information to the controller 24 which in turn actuates and controls the overprinting mechanism 22 to compensate for the difference in color—so that a proper overprinting ink (varnish, colors, security inks, conductive inks, etc) color is used.

Alternatively, the compensation process may be done by the processor using image processing, namely, by manipulating the overprinting file according to the color offset. Then, printing the manipulated file over or in relation to feature 14. Thus a suitable overprinting can be performed.

If the offset is global, the registration markers 12a and 12b and the feature 14 will be affected in an analogous manner. Alternatively, the offset may be local. In other words, only some features 14, or portions thereof, may be affected (have an offset). Either way, the imager 20 can determine and quantify such offsets and correct for them. The correction can be in the form of adding or reducing the intensity (amount of ink, varnish, etc., and/or perhaps its color) overprinted on the feature 14, or portion thereof; or even blocking out unintended stray or miss-placed lines/marks.

Figure 3G:
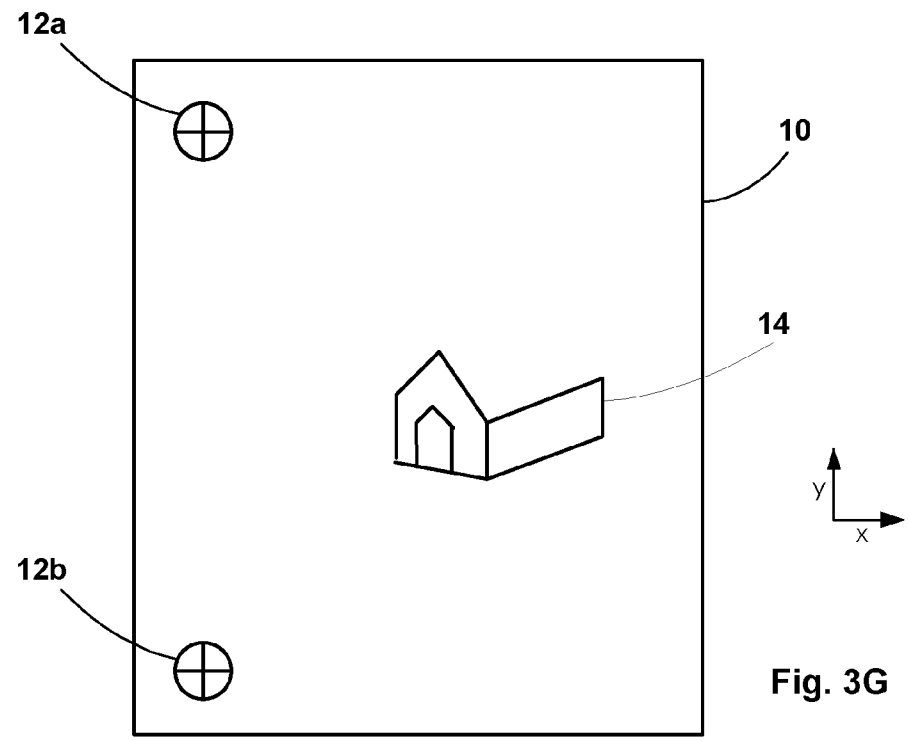
Figure 3H:
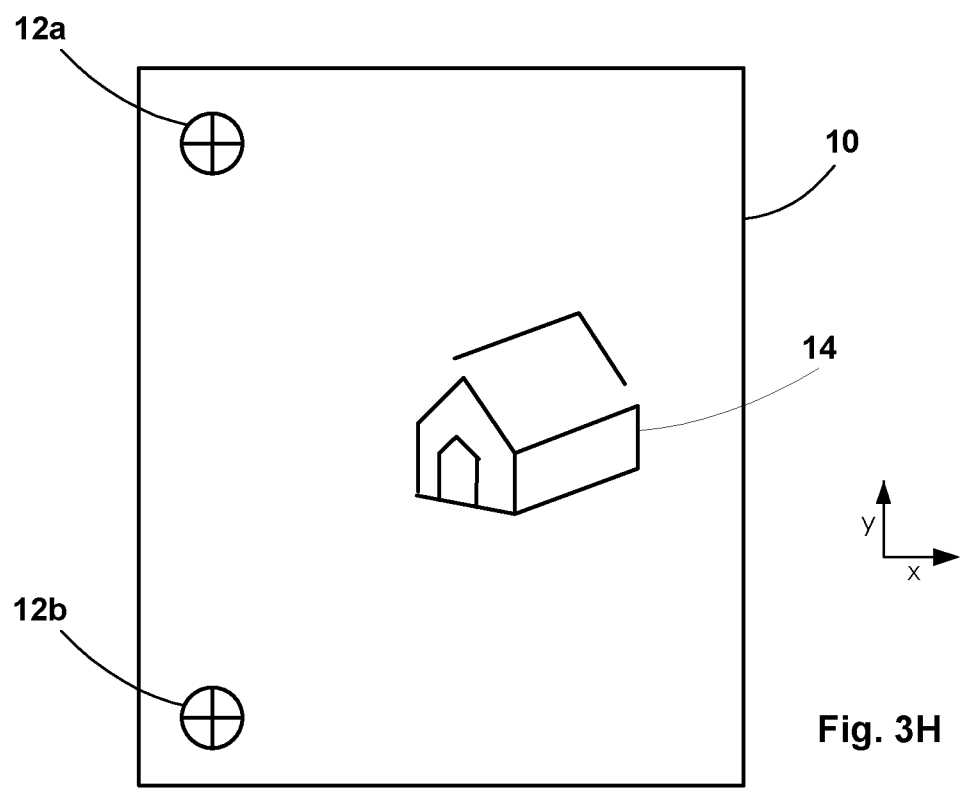

FIGS. 3G and 3H illustrate examples of local offsets, by way of the feature 14 which is exemplified by a simply drawn house. In FIG. 3G, the house feature 14 is missing the top of its roof. This can be added during the overprinting. In addition to determining and compensating for all of the aforementioned type offsets and others not exemplified, if any, the processor 25 compares the components of the feature 14 with a digitized image of the master substrate (not shown) whose data has been digitized and stored. As a result, the processor 25 determines that the roof top is missing and actuates the overprinting mechanism 22 to add it, in addition to any other overprinting applications.

Alternatively, the process may be done using image processing.

In case that feature 14 is both missing a part and has one or more offsets (such as in FIGS. 3A-3F), compensation process by the processor using image processing may be done by manipulating the digitized image of the master substrate according to the specific offset(s) in order to print the missing part(s) in the right position. Then, the overprinting file is manipulated according to the same offset(s) in order to overprint over feature 14. Thus a suitable overprinting can be performed.

An application of the aforementioned example is one wherein the overprinting completes or provides a portion of an electronic circuit, for example by printing an electronic ink to connect the ends of two portions of the electronic circuit.

FIG. 3H illustrates a slightly different issue. Here the rooftop of the feature 14 is in an incorrect position. The overprinting system performs a similar determination as just described, however, when overprinting, it must first delete the miss-positioned rooftop. This can be accomplished by determining the background color and overprinting that color on the miss-positioned rooftop in order to delete it, as well as overprinting the roof top as it should be.

Figure 4:
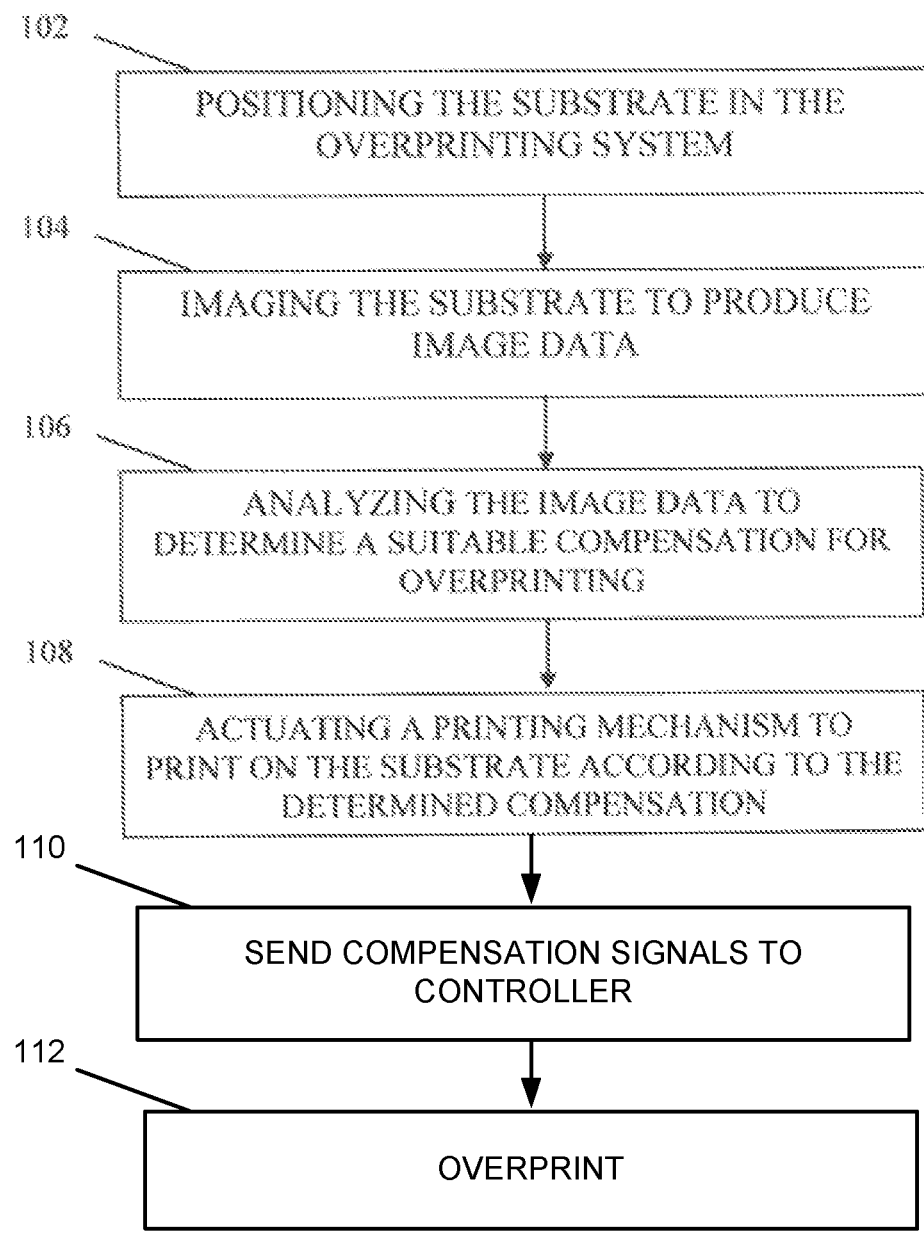
FIG. 4 is a flowchart depicting an embodiment of a method of the present invention.

FIG. 4 is a flowchart illustrating an embodiment of a method for overprinting wherein offset issues are taken into account. In a first step 102, the substrate is fed or otherwise positioned on the platform 18 of the overprinting system. Then, in a subsequent step 104, the substrate 10 is imaged, including imaging the registration markers 12a and 12b and all features 14 on the substrate. In a next step 106, the imager 20 provides a digitized image (image data) of the substrate 10 to the processor 25 which receives and analyzes the data and determines what compensation is required, if any, to compensate for the offsets that may be present, in a step 108. The controller 24 then, in a step 110, actuates the overprinting mechanism 22 in a suitable manner, by way of signals for the overprinting mechanism 22 to apply ink (varnish, colors, security inks, conductive inks etc.) shifted linearly (x-y direction), angularly, to compensate for intensity issues, color issues, local anomalies, and the like. In a final step 112, the overprinting mechanism 22 applies ink (varnish, colors, security inks, conductive inks etc.) in accordance with the signals provided to it by the controller 20.

In accordance with particular embodiments, the method further comprises inputting data relating to the features 14 of the substrate 10 as they are intended to be. In the case where local anomalies are to be corrected, such inputting of data would be required.

Figure 5:
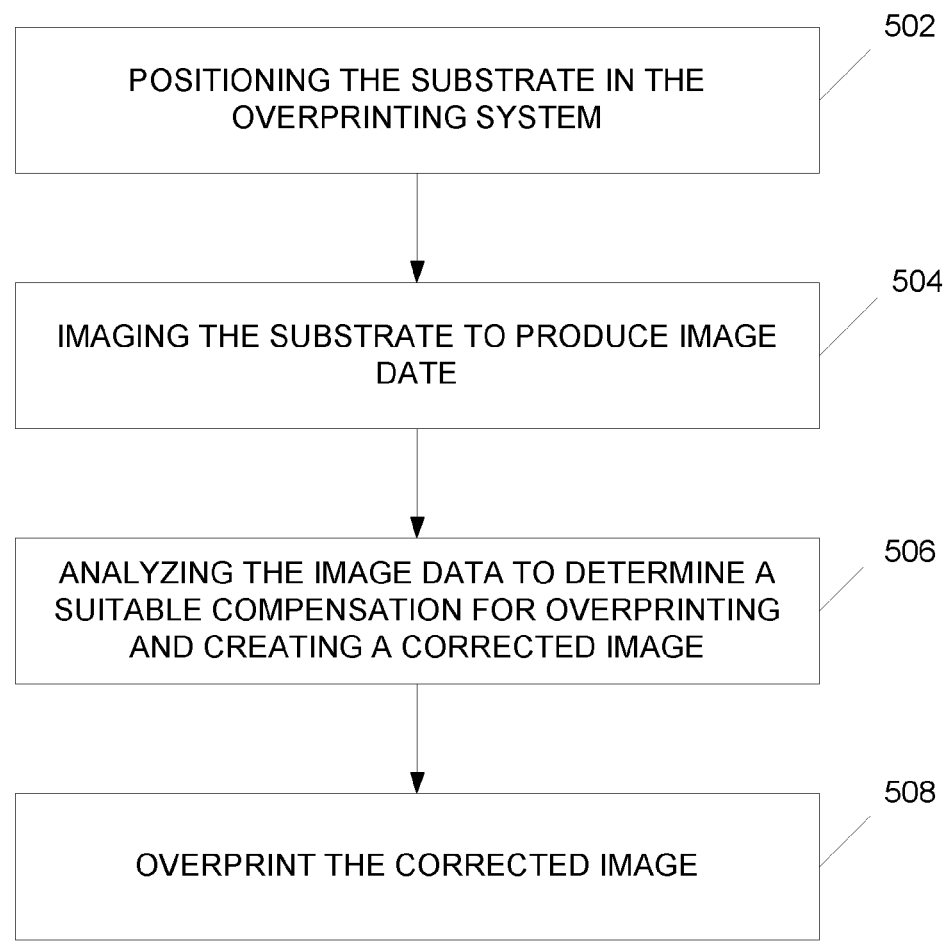
FIG. 5 is a flowchart depicting another embodiment of a method of the present invention.

FIG. 5 is a flowchart illustrating another embodiment of a method for overprinting wherein offset issues are taken into account. In a first step 502, the substrate is fed or otherwise positioned on the platform 18 of the overprinting system. Then, in a subsequent step 504, the substrate 10 is imaged, including imaging the registration markers 12a and 12b and all features 14 on the substrate. In a next step 506, the imager 20 provides a digitized image (image data) of the substrate 10 to the processor 25 which receives, analyzes the data, determines what compensation is required, if any, to compensate for the offsets that may be present and creates a corrected digital image. In a step 508 the controller 24 transmits the printing data of the corrected digital image to the printer in order to print the corrected image over or in relation to feature 14.

In accordance with particular embodiments, the method further comprises inputting data relating to the features 14 of the substrate 10 as they are intended to be. In the case where local anomalies are to be corrected, such inputting of data would be required.

It should be understood that the above description is merely exemplary and that there are various embodiments of the present invention that may be devised, mutatis mutandis.

The invention claimed is:

1. A method of adaptive overprinting of a first digital image over a pre-printed second image comprising at least one feature, the method comprising:
   capturing an image of a substrate pre-printed with said second image and with at least one registration mark;
   automatically computing one or more global offsets from intended pre-determined properties of the at least one registration mark;
   automatically computing one or more global compensation adjustment values to be applied to the at least one feature, based on said one or more computed global offsets;
   applying, by a processor using image processing, said computed one or more global compensation adjustment values to said first digital image to create a corrected digital image; and
   printing said corrected digital image over said second image.

2. The method of claim 1, wherein said global offset comprises at least one of a global spatial shifts, a global intensity shift and a global color shift.

3. The method of claim 2, wherein said global spatial shifts comprise at least one of a global rotational shift and a global size shift.

4. The method of claim 1, further comprising:
   automatically computing one or more local offsets from intended pre-determined properties of the at least one feature;
   automatically computing one or more local compensation adjustment values to be applied to the at least one feature, based on said one or more computed local offsets; and applying, by a processor using image processing, said computed one or more local compensation adjustment values to said first digital image to create a corrected digital image.

5. The method of claim 4, wherein said local offset comprises one or more missing parts of said at least one feature.

6. The method of claim 4, wherein said local offset comprises one or more shifted parts of said at least one feature.

7. The method of claim 4, wherein said local offset comprises at least one of a local intensity shift and a local color shift.

8. The method of claim 1, further comprising:
recording in a log identification information associated with the substrate when the one or more determined offsets have values indicative that the substrate requires shift adaptive overprint intervention.

9. The method of claim 1, wherein said substrate is a single page.

10. The method of claim 1, wherein said substrate is part of a roll.

11. The method of claim 1, wherein said printing comprises printing with one of: varnish, colors, security inks and conductive inks.

12. A system for adaptive overprinting of a first digital image over a pre-printed second image comprising at least one feature, the system comprising:
an imager configured to capture an image of a substrate pre-printed with said second image and with at least one registration mark;
a processor configured to:
automatically compute one or more global offsets from intended properties of the at least one registration mark pre-printed on the substrate, based on the captured image of the substrate;
automatically compute one or more global compensation adjustment values to be applied to the at least one feature, based on said computed global offsets; and
apply, using image processing, said computed one or more global compensation adjustment values to said first digital image to create a corrected digital image; and
a printer configured to print said corrected digital image over said second image.

13. The system of claim 12, wherein said global offset comprises at least one of a global spatial shift, a global intensity shift and a global color shift.

14. The system of claim 13, wherein said global spatial shifts comprise at least one of a global rotational shift and a global size shift.

15. The system of claim 12, wherein said processor is further configured to:
automatically compute one or more local offsets from intended pre-determined properties of the at least one feature;
automatically compute one or more local compensation adjustment values to be applied to the at least one feature, based on said one or more computed local offsets; and
apply, using image processing, said computed one or more local compensation adjustment values to said first digital image to create a corrected digital image.

16. The system of claim 15, wherein said local offset comprises one or more missing parts of said at least one feature.

17. The system of claim 15, wherein said local offset comprises one or more shifted parts of said at least one feature.

18. The system of claim 15, wherein said local offset comprises at least one of a local intensity shift and a local color shift.

19. The system of claim 12, wherein said substrate is a single page.

20. The system of claim 12, wherein said substrate is part of a roll.

* * * * *